(12) United States Patent
Zipfel et al.

(10) Patent No.: US 10,611,348 B2
(45) Date of Patent: Apr. 7, 2020

(54) BRAKE ARCHITECTURE FOR AUTOMATED DRIVING

(71) Applicant: Continental Automotive Systems, Inc., Auburn Hills, MI (US)

(72) Inventors: Thomas Zipfel, Royal Oak, MI (US); Yuji Nakayasu, Troy, MI (US); James Rizzo, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/165,407

(22) Filed: May 26, 2016

(65) Prior Publication Data

US 2017/0341630 A1 Nov. 30, 2017

(51) Int. Cl.
| | |
|---|---|
| *G01C 22/00* | (2006.01) |
| *G05D 1/00* | (2006.01) |
| *B60T 7/12* | (2006.01) |
| *B60T 11/10* | (2006.01) |

(52) U.S. Cl.
CPC ............... B60T 7/12 (2013.01); B60T 11/103 (2013.01)

(58) Field of Classification Search
CPC ................. B60T 17/18; B60T 2270/40; B60T 2276/402; B60T 7/12
See application file for complete search history.

(56) References Cited

U.S. PATENT DOCUMENTS

| | | | | |
|---|---|---|---|---|
| 4,749,238 A | * | 6/1988 | Singleton | .............. B60T 13/662 303/15 |
| 4,799,355 A | * | 1/1989 | Harrison | ................. B60T 13/12 417/385 |
| 4,957,329 A | * | 9/1990 | Matsuda | ............. B60T 8/17616 303/159 |
| 5,126,942 A | * | 6/1992 | Matsuda | ............ B60K 23/0808 180/197 |

(Continued)

FOREIGN PATENT DOCUMENTS

| | | |
|---|---|---|
| WO | 2015074935 A1 | 5/2015 |
| WO | 2015074936 A1 | 5/2015 |
| WO | 2016012331 A1 | 1/2016 |

OTHER PUBLICATIONS

The International Search Report and the Written Opinion of the International Searching Authority dated Jul. 25, 2017 for corresponding application No. PCT/US2017/034483.

*Primary Examiner* — Anne M Antonucci
*Assistant Examiner* — Kenny A. Taveras

(57) ABSTRACT

A braking system operable independent of driver input, where the braking system includes a primary brake system, a secondary brake system, a primary controller controlling fluid pressure in the primary brake system, and a secondary controller controlling fluid pressure in the secondary brake system independently of the primary controller. There is also an actuator which is part of the primary brake system, where the actuator is controlled by the primary controller. A reservoir is in fluid communication with both the primary brake system and the secondary brake system, to supply (Continued)

fluid to both the primary brake system and the secondary brake system. The primary controller selectively actuates the actuator to control the fluid pressure in the primary brake system independently of driver input, to provide braking capability to a fully autonomous driving vehicle.

10 Claims, 4 Drawing Sheets

(56) References Cited

U.S. PATENT DOCUMENTS

| | | | | |
|---|---|---|---|---|
| 5,472,264 A * | 12/1995 | Klein | B60T 13/745 | 188/181 C |
| 5,501,511 A * | 3/1996 | Wagner | B60T 8/261 | 303/113.5 |
| 5,884,986 A * | 3/1999 | Shimizu | B60T 8/4036 | 303/10 |
| 5,941,608 A * | 8/1999 | Campau | B60T 7/042 | 303/113.4 |
| 6,109,703 A * | 8/2000 | Takahashi | B60T 8/3255 | 303/113.4 |
| 6,161,903 A * | 12/2000 | Dieringer | B60T 8/3275 | 188/358 |
| 6,554,372 B1 * | 4/2003 | Mackiewicz | B60T 8/4045 | 303/11 |
| 7,150,508 B2 * | 12/2006 | Ganzel | B60T 8/4081 | 303/113.1 |
| 7,392,120 B2 * | 6/2008 | Matsumoto | B60T 8/17557 | 180/168 |
| 8,312,975 B2 * | 11/2012 | Burns | B60K 28/16 | 192/13 R |
| 8,583,358 B2 * | 11/2013 | Kelly | B60T 7/18 | 303/121 |
| RE44,677 E * | 12/2013 | Campau | B60T 7/042 | 303/113.4 |
| 8,694,222 B2 * | 4/2014 | Zagorski | B60T 7/22 | 701/70 |
| 2005/0029864 A1 * | 2/2005 | Bauer | B60T 7/12 | 303/191 |
| 2005/0218719 A1 * | 10/2005 | Hatipoglu | B60T 8/175 | 303/188 |
| 2006/0186733 A1 * | 8/2006 | Drumm | B60T 7/042 | 303/114.1 |
| 2006/0238025 A1 * | 10/2006 | Mori | B60T 8/266 | 303/186 |
| 2007/0267915 A1 * | 11/2007 | Shimada | B60K 6/44 | 303/122 |
| 2009/0077963 A1 * | 3/2009 | Ganzel | B60T 8/34 | 60/562 |
| 2010/0078990 A1 * | 4/2010 | Nanri | B60T 8/3225 | 303/119.1 |
| 2011/0006594 A1 * | 1/2011 | Ganzel | B60T 8/4077 | 303/10 |
| 2011/0031804 A1 * | 2/2011 | Shimada | B60T 8/266 | 303/2 |
| 2011/0115282 A1 * | 5/2011 | Dinkel | B60T 7/042 | 303/3 |
| 2011/0160972 A1 * | 6/2011 | Crombez | B60T 7/042 | 701/70 |
| 2011/0256980 A1 * | 10/2011 | Saito | B60W 10/06 | 477/183 |
| 2012/0118682 A1 * | 5/2012 | Murayama | B60T 13/166 | 188/152 |
| 2012/0123644 A1 * | 5/2012 | Waldmann | B60T 7/042 | 701/45 |
| 2013/0184954 A1 * | 7/2013 | Treppenhauer | B60T 7/122 | 701/70 |
| 2013/0211668 A1 * | 8/2013 | Watanabe | B60Q 1/441 | 701/36 |
| 2013/0320751 A1 * | 12/2013 | Eberling | B60T 7/042 | 303/14 |
| 2014/0305751 A1 * | 10/2014 | Yamamoto | B60T 8/00 | 188/72.4 |
| 2015/0151726 A1 * | 6/2015 | McClain | B60T 7/042 | 303/15 |
| 2015/0197226 A1 * | 7/2015 | Svensson | B60T 8/268 | 701/70 |
| 2016/0009267 A1 * | 1/2016 | Lesinski, Jr. | B60T 8/885 | 303/10 |
| 2016/0016571 A1 * | 1/2016 | Ganzel | B60T 13/168 | 303/66 |
| 2016/0023644 A1 * | 1/2016 | Feigel | B60T 8/4081 | 303/3 |
| 2016/0059706 A1 * | 3/2016 | Kunz | B60T 8/4072 | 303/3 |
| 2016/0114779 A1 * | 4/2016 | Binder | B60T 7/042 | 701/76 |
| 2016/0152223 A1 * | 6/2016 | Bauer | B60T 13/745 | 303/14 |
| 2016/0214582 A1 * | 7/2016 | Brenn | B60T 7/12 | |
| 2016/0214595 A1 * | 7/2016 | Baehrle-Miller | B60T 7/22 | |
| 2016/0236664 A1 * | 8/2016 | Aoki | B60T 8/4081 | |
| 2016/0297413 A1 * | 10/2016 | Alford | B60T 8/4081 | |
| 2016/0318403 A1 * | 11/2016 | Nedley | B60L 3/102 | |
| 2016/0332610 A1 * | 11/2016 | Wolff | B60T 1/10 | |
| 2016/0339880 A1 * | 11/2016 | Svensson | B60T 7/22 | |
| 2016/0339885 A1 * | 11/2016 | Linhoff | B60T 8/4072 | |
| 2016/0368465 A1 * | 12/2016 | Odate | B60T 7/22 | |
| 2017/0001613 A1 * | 1/2017 | Stemmer | B60T 8/94 | |
| 2017/0008591 A1 * | 1/2017 | Abbott | B62K 5/027 | |
| 2017/0090473 A1 * | 3/2017 | Cooper | G05D 1/0027 | |
| 2017/0129487 A1 * | 5/2017 | Wulf | B60W 30/09 | |
| 2017/0137023 A1 * | 5/2017 | Anderson | B60W 30/02 | |
| 2017/0166173 A1 * | 6/2017 | Lauffer | B60T 8/17 | |

* cited by examiner

BRAKE ARCHITECTURE FOR AUTOMATED DRIVING

FIELD OF THE INVENTION

The invention relates generally to a brake system for an autonomous driving vehicle, which eliminates unnecessary components.

BACKGROUND OF THE INVENTION

Vehicles with autonomous driving capabilities are becoming increasingly common. Some vehicles are fully autonomous, and do not require the input of a driver. Furthermore, there are also vehicles which are used for transporting passengers or cargo, but do not have a driver, and are designed such that a driver never provides any type of input to control the vehicle. Therefore the operation of the vehicle, such as steering, turning, acceleration, and braking, are controlled by various components, such as control modules and the like. The control modules receive input from various devices, such as sensors, GPS, and the like, to determine what operations are to be performed based on certain parameters such as local speed limits, oncoming traffic signals, and the speed and location of nearby vehicles. With more vehicles being fully operational without the use of driver input, there is less and less of a need for various components which are typically used by a driver to control and maneuver the vehicle.

Accordingly, there exists a need for a braking system which may be used as part of a fully autonomous vehicle, where the braking system eliminates unnecessary components which are used by a driver to control the braking system of the vehicle.

SUMMARY OF THE INVENTION

The present invention is a braking system which does not have any components which are used by a human driver for input.

In one embodiment, the present invention is a braking system operable independent of driver input, where the braking system includes a primary brake system, a secondary brake system, a primary controller controlling fluid pressure in the primary brake system, and a secondary controller controlling fluid pressure in the secondary brake system independently of the primary controller. There is also an actuator which is part of the primary brake system, where the actuator is controlled by the primary controller. A reservoir is in fluid communication with both the primary brake system and the secondary brake system, to supply fluid to both the primary brake system and the secondary brake system. The primary controller selectively actuates the actuator to control the fluid pressure in the primary brake system independently of driver input.

There is also at least one ABS valve being part of the primary brake system, and at least one transition conduit placing the primary brake system in fluid communication with the secondary brake system. When there is a malfunction in the primary brake system, the secondary brake system is controlled by the secondary controller.

When there is a malfunction in the primary brake system, the secondary controller is active and controls the fluid pressure in the secondary brake system, such that the secondary controller controls the fluid pressure of the secondary brake system independently of driver input.

The braking system of the present invention also includes a virtual driver, where the virtual driver provides input to the primary controller to operate the primary brake system. The vehicle which incorporated the braking system according to the present invention includes several devices, such as sensors, a LIDAR system, GPS, or other devices which may be used alone or in combination to determine the environment around the vehicle. These devices function as the virtual driver.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
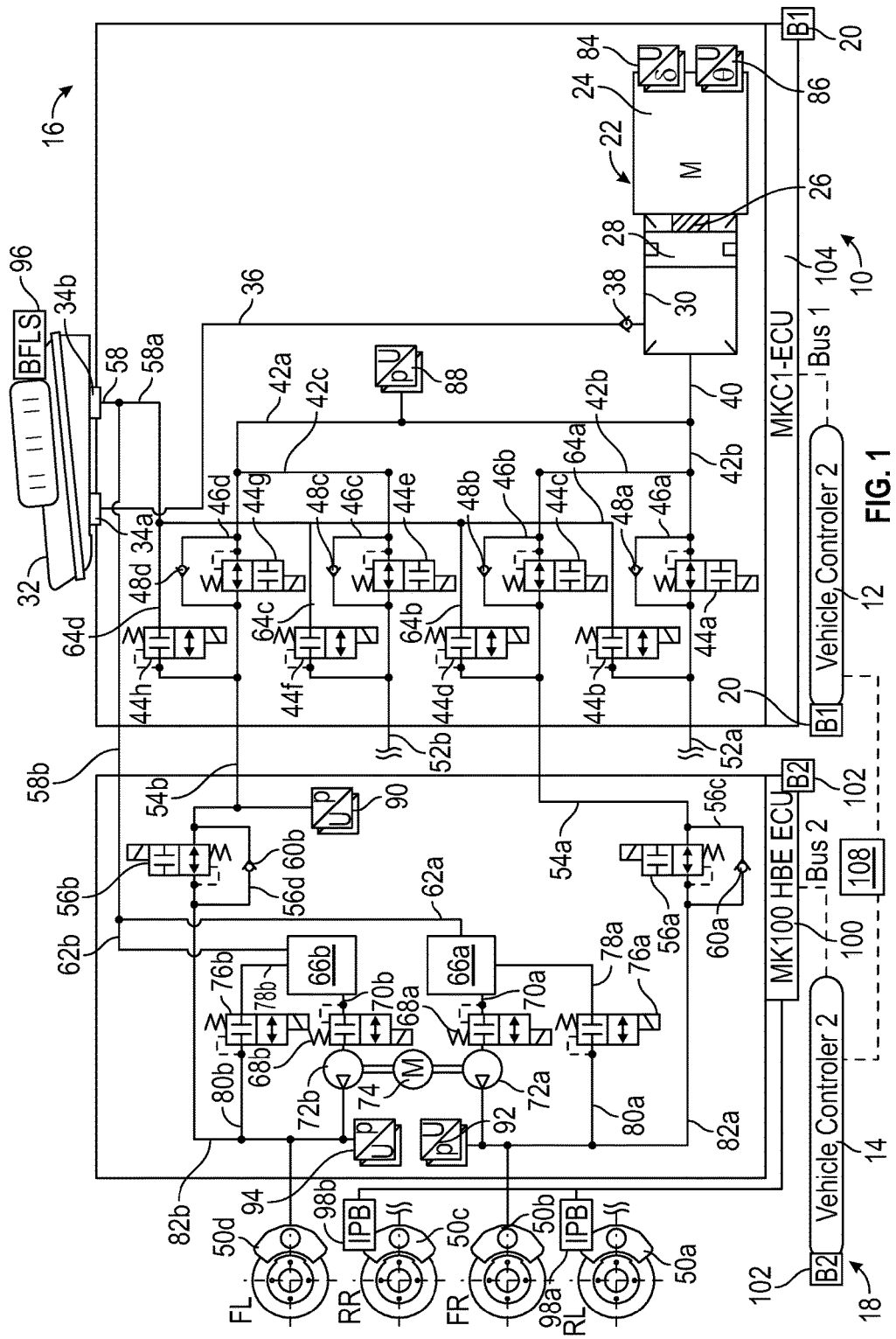
FIG. 1 is a diagram of a braking system for an autonomous driving vehicle, according to embodiments of the present invention.

A diagram of a braking system according to a first embodiment of the present invention is shown in FIG. 1, generally at 10. The system 10 includes a first vehicle controller 12, and a second, or redundant, vehicle controller 14. The first vehicle controller 12 controls a primary brake system, shown generally at 16, and the second vehicle controller 14 is used to control a secondary brake system, generally at 18.

The primary brake system 16 includes a battery 20 which is used to supply power to an actuator, shown generally at 22. The actuator 22 in this embodiment is a ball-screw-type of actuator 22, which includes a motor 24, which rotates a shaft 26 to move a piston 28 in a cylinder 30. The actuator 22 is used to circulate fluid in a plurality of conduits. The system 10 also includes a reservoir 32 which includes two connectors 34a, 34b. The reservoir 32 is divided into different sections, which are separated by partitions (not shown), where each connector 34a,34b provides fluid communication between each section of the reservoir 32 and a corresponding fluid conduit connected to each connector 34a,34b. The first connector 34a is connected to a return conduit 36, which is in fluid communication with cylinder 30. Disposed in the return conduit 36 is a check valve 38 which allows for fluid in the conduit 36 to transfer to the cylinder 30 as the piston 28 is moved in a first direction towards the motor 24. Also connected to the cylinder 30 is a main feed conduit 40, and the main feed conduit 40 is connected to and in fluid communication with several other feed conduits 42a,42b,42c,42d which are connected to and in fluid communication with several anti-lock braking system (ABS) valves 44a,44b,44c,44d,44e,44f,44g,44h. Four of the ABS valves 44a,44c,44e,44g also have pressure relief conduits 46a,46b,46c,46d, and a check valve 48a,48b,48c, 48d located in a corresponding conduit 46a,46b,46c,46d. The system 10 also includes four braking units 50a,50b,50c, 50d, and there are two ABS valves 44a,44b,44c,44d,44e, 44f,44g,44h responsible for providing an anti-lock braking function for each braking unit 50a,50b,50c,50d. More specifically, the first two ABS valves 44a,44b provide the anti-lock braking function for the first braking unit 50a, the third and fourth ABS valves 44c,44d provide the anti-lock braking function for the second braking unit 50b, the fifth and sixth ABS valves 44e,44f provide the anti-lock braking function for the third braking unit 50c, and the seventh and eighth ABS valves 44g,44h provide the anti-lock braking function for the fourth braking unit 50d. The first two ABS valves 44a,44b are connected to and in fluid communication with the first braking unit through a first final conduit 52a, and the fifth and sixth ABS valves 44e,44f are connected to and in fluid communication with the third braking unit 50c through a second final conduit 52b, as shown in FIG. 1.

The third and fourth ABS valves 44c,44d and the seventh and eighth ABS valve 44g,44h are connected to and in fluid communication with the secondary brake system 10 through corresponding transition conduits 54a,54b. More specifically, the first transition conduit 54a is connected to and in fluid communication with a first master cylinder cut valve 56a, and the second transition conduit 54b is connected to and in fluid communication with a second master cylinder cut valve 56b. Each of the master cylinder cut valves 56a,56b have corresponding pressure relief conduits 56c, 56d, and corresponding check valves 60a,60b. The master cylinder cut valves 56a,56b are part of the secondary brake system 18.

In addition to the return conduit 36, also connected to and in fluid communication with the reservoir 32 is an upstream feed conduit 58, the upstream feed conduit 58 branches into two separate secondary feed conduits 58a,58b. One of the secondary feed conduits 58a is connected to and in fluid communication with several sub-conduits 64a,64b,64c,64d, where the first sub-conduit 64a is in fluid communication with the second ABS valve 44b, the second sub-conduit 64b is in fluid communication with the fourth ABS valve 44d, the third sub-conduit 64c is in fluid communication with the sixth ABS valve 44f, and the fourth sub-conduit 64d is in fluid communication with the eighth ABS valve 44h.

The other secondary feed conduit 58b is in fluid communication with the secondary brake system 18, and more specifically splits into two additional conduits 62a,62b, which are connected to and in fluid communication with corresponding reservoirs 66a,66b. The secondary brake system 18 also includes two low-pressure feed valves 68a,68b, which are in fluid communication with the corresponding reservoirs 66a,66b through conduits 70a,70b as shown in FIG. 1. Each of the low-pressure feed valves 68a,68b is connected to and in fluid communication with a pump 72a,72b, and both pumps 72a,72b are driven by a motor 74.

The secondary brake system 18 also includes excess pressure relief valves 76a,76b which are in fluid communication with the reservoirs 66a,66b through pressure relief conduits 78a,78b as shown in FIG. 1. There are also two corresponding downstream pressure relief conduits 80a,80b which are connected to the excess pressure relief valves 76a,76b as shown in FIG. 1, and the conduits 80a,80b are also connected to and in fluid communication with corresponding cut-valve downstream conduits 82a,82b. Each of the cut-valve downstream conduits 82a,82b splits, such that the first cut-valve downstream conduit 82a is in fluid communication with the second braking unit 50b and the first pump 72a, and the second cut-valve downstream conduit 82b is in fluid communication with the fourth braking unit 50d and the second pump 72b.

There are also several sensors used to monitor various operating parameters at different locations in each system 16,18. In this embodiment shown in FIG. 1, there is a position sensor 84 and a temperature sensor 86 for monitoring the position and the temperature of the motor 24. There are also several pressure sensors, one pressure sensor 88 connected to one of the feed conduits 42a, another pressure sensor 90 connected to one of the transition conduits 54b, and two pressure sensors 92,94 connected to each corresponding pump 72a,72b. There is also a brake fluid level sensor 96 which is connected to the reservoir 32, which is used to detecting the level of fluid in the reservoir 32.

Additionally, there is also a first parking brake unit 98a which is attached to the first, or rear left braking unit 50a, and a second parking brake unit 98b which is attached to the third, or rear right braking unit 50c. The parking brake units 98a,98b are controlled by a secondary controller 100, which is part of the secondary brake system 18. The secondary controller 100 is in electrical communication with the second vehicle controller 14, and both the secondary controller 100 and the second vehicle controller 14 are powered by a battery 102.

The primary braking system 16 also includes a primary controller 104 which is in electrical communication with the first vehicle controller 12, and both the primary controller 104 and first vehicle controller 12 are powered by the battery 20.

In operation, the first vehicle controller 12 receives input to determine when and how the primary brake system 16 should be operated. This input may be received from various devices, such as sensors, a LIDAR system, GPS, or other devices which may be used alone or in combination to determine the environment around the vehicle. These devices may function as a virtual driver 108, which, based on the surrounding environment (such as the location and speed of nearby vehicles, local traffic ordinances, speed limits, nearby pedestrians, and nearby signs and traffic signals, and weather conditions) send signals providing input the vehicle in a similar manner to a human driver, to command the controllers 12,14 to operate the primary brake system 16, or the secondary brake system 18, respectively. If it is determined one or more of the braking units 50a, 50b,50c,50d needs to be activated, the first vehicle controller 12 sends signals to the primary controller 104 to activate the motor 24. The motor 24 rotates the shaft 26 to move the piston 28 in the first direction, towards the motor 24, or a second direction, away from the motor 24. When the piston 28 is moved in the first direction, fluid is drawn into the cylinder 30 from the return conduit 36 and through the check valve 38.

When the piston 28 is moved in the second direction, fluid is forced into the main feed conduit 40, and is then distributed throughout the other various conduits 42a,42b,42c,42d mentioned above, depending on the configuration of the ABS valves 44a,44b,44c,44d,44e,44f,44g,44h of the primary brake system 16. A portion of the fluid flows through the final conduits 52a,52b such that the rear brake units 50a,50c are actuated, and another portion of the fluid flows through the transition conduits 54a,54b into the secondary brake system 18. When the primary brake system 16 is operating, the secondary brake system 18 is inactive. When the secondary brake system 18 is inactive, the fluid flowing through the transition conduits 54a,54b passes through the master cylinder cut valves 56a,56b, and flows through the cut-valve downstream conduits 82a,82b and to the front right brake unit 50b and the front left brake unit 50d to generate a braking force. The piston 28 is moved in either the first direction to decrease braking force or the second direction to increase braking force.

If there is a failure anywhere in the primary brake system 16, the secondary brake system 18 is activated. The failure in the primary brake system 16 may be a result of failure of the actuator 22, a failure in the first vehicle controller 12, the primary controller 104, or some other component in the primary brake system 16. The second vehicle controller 14 receives the input, and responds by sending commands to the secondary controller 100. When the secondary brake system 18 is activated, the secondary controller 100 configures the master cylinder cut valves 56a,56b to be in a closed position, preventing fluid from passing back into the transition conduits 54a,54b. Each of the reservoirs 66a,66b receive fluid from the reservoir 32, and the secondary controller 100 controls the motor 74, to thereby control each of the pumps 72a,72b. Each of the low-pressure feed valves 68a,68b controls the flow of fluid from the corresponding reservoirs 66a,66b to each pump 72a,72b, and the excess pressure relief valves 76a,76b relieve pressure in the cut-valve downstream conduits 82a,82b to keep the pressure in the cut-valve downstream conduits 82a,82b below a desired level.

Figure 2:
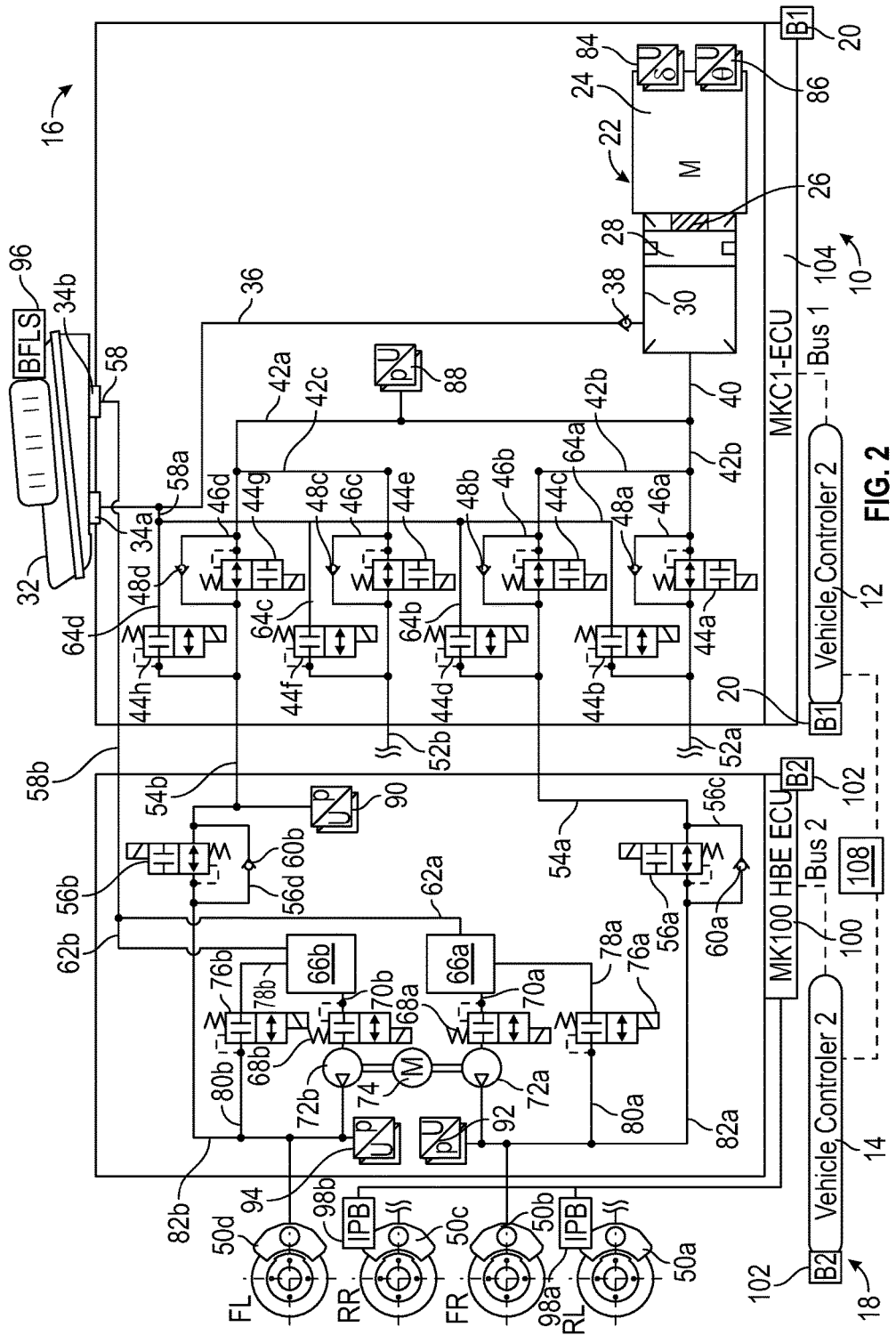
FIG. 2 is a diagram of an alternate embodiment of a braking system for an autonomous driving vehicle, according to embodiments of the present invention.

Another embodiment of the invention is shown in FIG. 2, with like numbers referring to like elements. In this embodiment, the upstream feed conduit 58 is only in fluid communication with the secondary feed conduit 58b, and the other secondary feed conduit 58a is connected to and in fluid communication with the return conduit 36.

Figure 3:
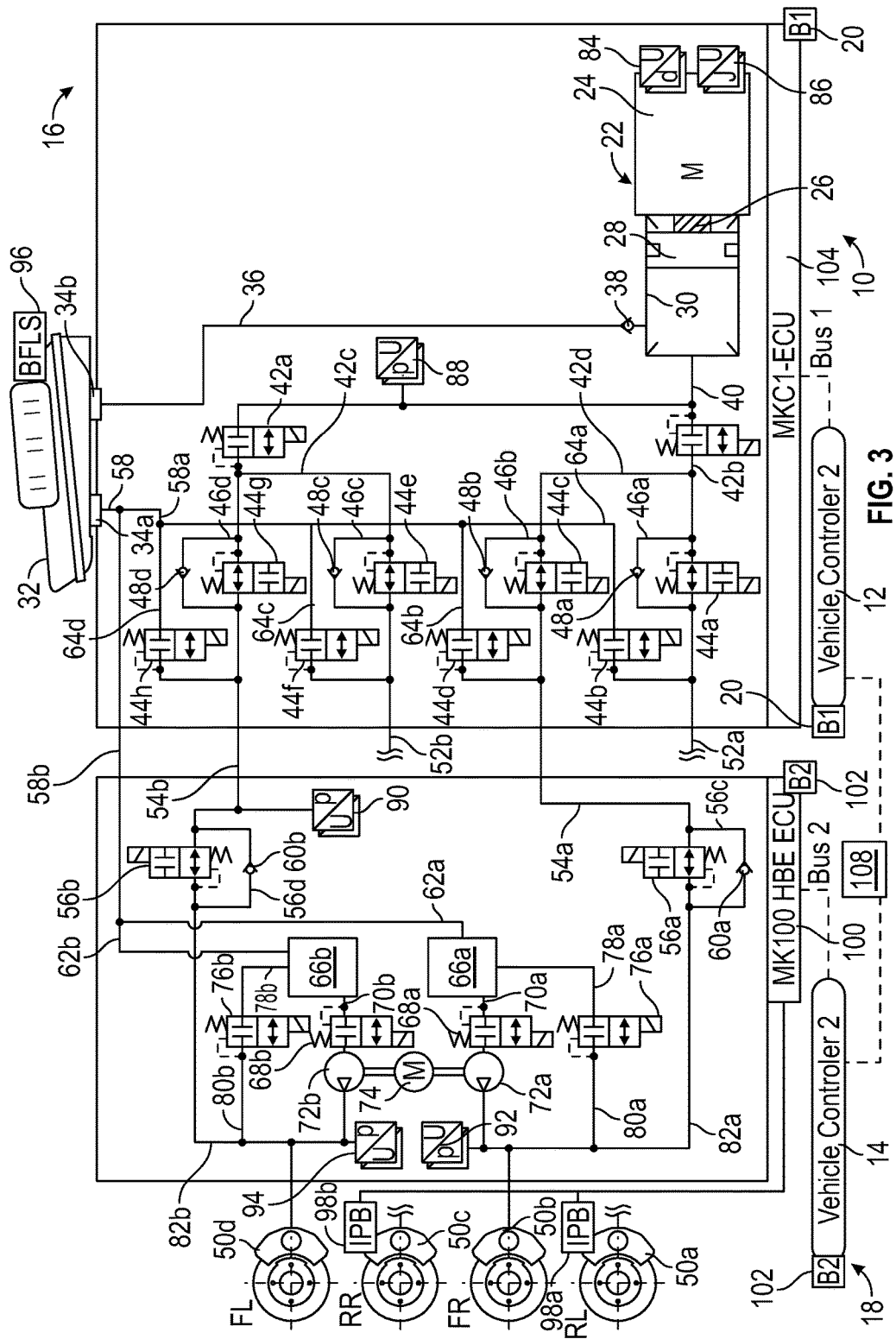
FIG. 3 is a diagram of another alternate embodiment of a braking system for an autonomous driving vehicle, according to embodiments of the present invention.

Another embodiment of the invention is shown in FIG. 3, with like numbers referring to like elements. In this embodiment, the upstream feed conduit 58 is still connected both the secondary feed conduits 58a,58b, but the upstream feed conduit 58 is connected to the first connector 34a, and the return conduit 36 is connected to the second connector 34b.

Figure 4:
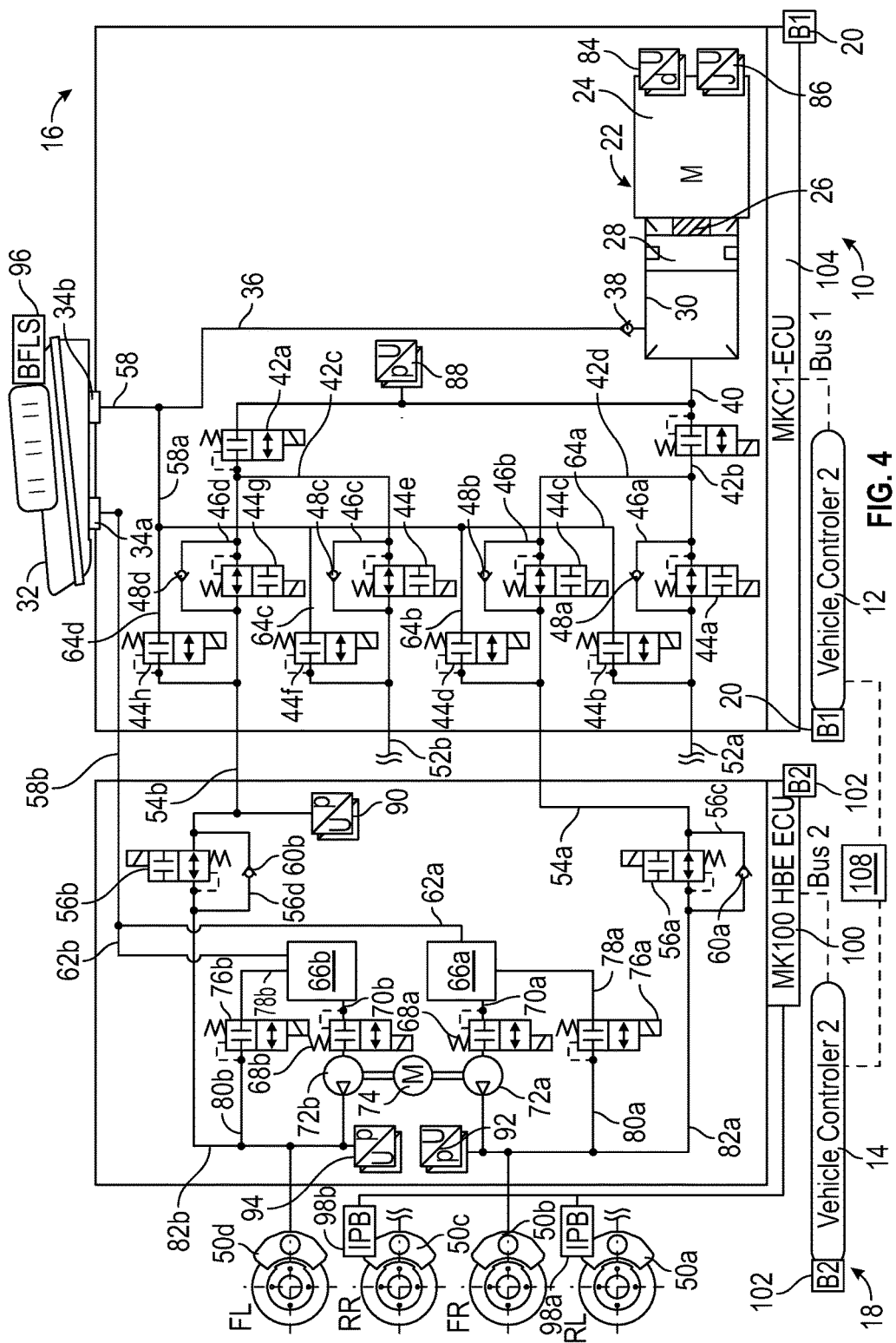
FIG. 4 is a diagram of another alternate embodiment of a braking system for an autonomous driving vehicle, according to embodiments of the present invention.

Yet another embodiment is shown in FIG. 4, with like numbers referring to like elements. In this embodiment, the upstream feed conduit 58 is connected to the first connector 34b, and the upstream feed conduit 58 is connected to and in fluid communication with the secondary feed conduit 58a and the return conduit 36. The other secondary feed conduit 58b is connected to the first connector 34a.

The embodiments shown in FIGS. 2-4 provide the same functionality as the system 10 shown in FIG. 1, but demonstrate there are other possible configurations for the upstream feed conduit 58, secondary feed conduits 58a,58b, and return conduit 36. Although the variations in FIGS. 2-4 are shown, it is within the scope of the invention that other configurations may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A braking system operable independent of driver input, comprising:
    a primary brake system;
    a secondary brake system;
    at least one braking unit controlled by the primary brake system or the secondary brake system;
    a primary controller controlling fluid pressure in the primary brake system;
    a secondary controller controlling fluid pressure in the secondary brake system independently of the primary controller;
    an actuator being part of the primary brake system, the actuator controlled by the primary controller;
    a motor driving at least one pump being part of the secondary brake system, the motor controlled by the secondary controller;
    a reservoir in fluid communication with both the primary brake system and the secondary brake system; and
    at least one transition conduit placing the primary brake system in fluid communication with the secondary brake system, wherein the at least one transition conduit includes at least one master cylinder cut valve that enables communication of fluid pressure from the primary brake system to the secondary brake system and disables communication of fluid pressure from the secondary system to the primary brake system responsive the primary brake system not being operational;
    wherein the primary controller selectively actuates the actuator to control the fluid pressure in the primary brake system independently of driver input, and when the primary brake system is active, fluid is pressurized in the primary brake system, passes through the at least one transition conduit and through the secondary brake system to actuate the at least one braking unit.

2. The braking system operable independent of driver input of claim 1, wherein the secondary controller is active and controls the fluid pressure in the secondary brake system when there is a malfunction in the primary brake system and fluid pressure in the secondary brake system is prevented from being communicated to the primary brake system by the at least one master cylinder cut valve.

3. The braking system operable independent of driver input of claim 1, wherein the secondary controller controls the fluid pressure of the secondary brake system independently of driver input with the motor driving that at least one pump.

4. The braking system operable independent of driver input of claim 1, further comprising a virtual driver, wherein the virtual driver provides input to the primary controller to operate the primary brake system.

5. The braking system operable independent of driver input of claim 4, wherein the secondary controller receives input from the virtual driver when the primary brake system is malfunctioning.

6. The braking system as recited in claim 1, wherein the actuator comprises a first motor within the primary brake system and the motor comprises a second motor different than the first motor within the secondary brake system.

7. The braking system as recited in claim 6, wherein fluid pressure provided by the second motor driving the at least one pump is not communicated to the primary brake system.

8. The braking system as recited in claim 1, wherein the at least one braking unit comprises four braking units with a first two of the four braking units receiving fluid pressure from only the primary braking system and a second two of the four braking units receiving fluid pressure from either the primary braking system and the secondary braking system.

9. The braking system as recited in claim 8, wherein the master cylinder cut valve enables communication of fluid pressure from both the primary brake system and the secondary brake system to the second two of the four braking units.

10. The braking system as recited in claim 9, wherein both of the second two of the four braking units provide braking to a front wheel of the vehicle.

\* \* \* \* \*